(12) United States Patent
Lin et al.

(10) Patent No.: US 11,415,768 B2
(45) Date of Patent: Aug. 16, 2022

(54) SYSTEMATIC FIBER ROUTING ASSEMBLY FOR OPTICAL ELECTRONICS

(71) Applicant: QUANTA COMPUTER INC., Taoyuan (TW)

(72) Inventors: Chang-Sheng Lin, Taoyuan (TW); Zong-Syun He, Taoyuan (TW); Hsiao-Hsien Weng, Taoyuan (TW); Rong-Teng Sie, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 0 days.

(21) Appl. No.: 17/329,697

(22) Filed: May 25, 2021

(65) Prior Publication Data

US 2022/0187559 A1 Jun. 16, 2022

Related U.S. Application Data

(60) Provisional application No. 63/125,193, filed on Dec. 14, 2020.

(51) Int. Cl.
*G02B 6/00* (2006.01)
*G02B 6/44* (2006.01)

(52) U.S. Cl.
CPC ......... *G02B 6/4471* (2013.01); *G02B 6/4441* (2013.01)

(58) Field of Classification Search
CPC ....... G02B 6/4471; G02B 6/4441; G02B 6/00
See application file for complete search history.

(56) References Cited

U.S. PATENT DOCUMENTS

| | | | |
|---|---|---|---|
| 2013/0028567 A1* | 1/2013 | Parikh | G02B 6/4452 385/135 |
| 2014/0205244 A1* | 7/2014 | Bradley | G02B 6/02042 385/78 |
| 2021/0080671 A1* | 3/2021 | Bell | G02B 6/4455 |

* cited by examiner

*Primary Examiner* — Jennifer Doan
(74) *Attorney, Agent, or Firm* — Nixon Peabody LLP

(57) ABSTRACT

An optical fiber routing assembly for interfacing with co-package optical (CPO) modules is disclosed. The optical fiber routing assembly includes a housing, a plurality of terminated optical fibers routed within the housing, a first set of adapters, and a second set of adapters. The first set of adapters is arranged vertically on an upper panel of the housing and facilitates connecting the plurality of terminated optical fibers to the CPO modules via terminated jumper optical fibers. The second set of adapters is arranged horizontally and configured to facilitate connecting the plurality of terminated optical fibers to one or more electronic systems. A combination of the first set of adapters and the second set of adapters facilitates communication between the CPO modules and the electronic systems. The optical fiber routing assembly provides fiber management to alleviate maintenance or heat issues associated with dense fiber routing around electronic components.

20 Claims, 11 Drawing Sheets

SYSTEMATIC FIBER ROUTING ASSEMBLY FOR OPTICAL ELECTRONICS

CROSS-REFERENCE TO RELATED APPLICATIONS

This application claims priority to and the benefit of U.S. Provisional Patent Application No. 63/125,193, filed on Dec. 14, 2020, which is hereby incorporated by reference in its entirety.

TECHNICAL FIELD

The present disclosure relates generally to efficiently routing cables within computing systems. More particularly, the present disclosure relates to systems and methods for routing optical fiber cables on an optical embedded switch.

BACKGROUND

Computing systems are used in different contexts for a wide range of functions. Some computing systems operate on batteries and may require low-power operation to conserve charge on the batteries. On the other hand, some computing systems may be plugged into a power outlet, and low-power operation is not as important as computing performance. Many computing systems balance performance and power consumption, even when plugged into a power outlet. Computing systems are essential in today's world, especially with many different types of computing systems being used for communication and data transmission. For example, different types of mobile phones can connect to the same mobile network, which can be upgraded over generations to support newer mobile phone technologies. For example, browsing the internet is very popular on mobile phones, but the browsing experience is starkly different between a 3G mobile network, a 4G mobile network, and a 5G mobile network. As newer mobile network technologies push the boundary when it comes to network speed, underlying electronic elements or the mobile network back-end should adapt to handle the increased speed.

With increased speed comes a larger application space. Giant datacenters and artificial intelligence markets are rising, thus placing a burden on network switches. Network switches have operated faster in each successive generation, as a result. Due to the increased speed, switches, from the first standard package of Gigabit Interface Converter (GBIC) to the quad small factor pluggable-double density (QSFP-DD) and octal small form factor (OSFP), have used pluggable modules. Nowadays, switches process data transmitted through pluggable modules connected to optical fiber. In traditional switches, the quality of circuit design and the signal processor being used play a major role in the switch's high-rate or low-rate signal transmission. Nowadays, whether a switch is designated for high-rate signal transmission primarily depends on the processing speed of both the application specific integrated circuit (ASIC) chipset and optical module of the switch. The processing rate of the switch is increased, as long as a high processing speed ASIC chipset, an optical module and a low-loss printed circuit board are used. As transmission rate increases, signal loss from metal traces also increases. In order to increase transmission efficiency, error correction and compensating functions, for example, an equalizer, are typically applied. Even though these functions can increase transmission efficiency, they introduce additional steps in order to realize this increased transmission efficiency. The additional steps can increase cost. The present disclosure is directed at solving problems related to achieving higher transmission efficiency without having to introduce costly compensation functions. The present disclosure introduces a design of an embedded optical system.

SUMMARY

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter; nor is it intended to be used in isolation to determine the scope of the claimed subject matter. The subject matter should be understood by reference to appropriate portions of the entire specification of this disclosure, any or all drawings and each claim.

Some implementations of the present disclosure provide an optical fiber routing assembly for interfacing with co-package optical (CPO) modules. The optical fiber routing assembly includes a housing, a plurality of terminated optical fibers routed within the housing, a first set of adapters arranged vertically on an upper panel of the housing, and a second set of adapters arranged horizontally. Each of the terminated optical fibers is terminated with a fiber connector on each end of the optical fiber. The first set of adapters is configured to facilitate connecting the plurality of terminated optical fibers to the CPO modules via terminated jumper optical fibers separate and distinct from the terminated optical fibers. The second set of adapters is configured to facilitate connecting the plurality of terminated optical fibers to one or more electronic systems. The combination of the first set of adapters and the second set of adapters facilitates communication between the CPO modules and the one or more electronic systems.

In an implementation, the CPO modules are positioned above the upper panel of the housing. In an implementation, the assembly is an isolated set such that the housing is configured to be installed and removed from a CPO switch. In an implementation, the first set of adapters is arranged in a square-like configuration around an application specific integrated circuit (ASIC). In an implementation, multiple terminated jumper optical fibers are used to connect the first set of adapters such that each of the multiple jumper optical fibers is of the same or different length. In an implementation, the second set of adapters includes a laser port, a data transmission adapter, or both. In an implementation, the housing includes side panels with slide rails. In an implementation, the slide rails have a fixing point. In an implementation, the first set of adapters includes an inner set of adapters and an outer set of adapters, the inner set of adapters is located closer to the CPO modules when compared to the outer set of adapters. In an implementation, one of the plurality of terminated optical fibers connecting a first one of the first set of adapters and a first one of the second set of adapters exhibits greater bending proximate to the first one of the first set of adapters compared to the first one of the second set of adapters.

Some implementations of the present disclosure provide a co-packaged optical (CPO) switch. The CPO switch includes an outer frame, an application specific integrated circuit (ASIC) carrier including CPO modules and an ASIC for performing switching operations, and an optical fiber routing assembly. The optical fiber routing assembly includes a housing, a plurality of terminated optical fibers routed within the housing, a first set of adapters arranged vertically on an upper panel of the housing, and a second set of adapters arranged horizontally when compared to the first set of adapters. The first set of adapters is configured to facilitate connecting the plurality of optical fibers to the CPO modules via terminated jumper optical fibers separate and distinct from the plurality of terminated optical fibers. The second set of adapters is configured to facilitate connecting the plurality of terminated optical fibers to one or more electronic systems. A combination of the first set of adapters and the second set of adapters facilitates communication between the CPO modules and the one or more electronic systems.

In an implementation, the CPO modules are positioned above the upper panel of the housing of the optical fiber routing assembly. In an implementation, the housing of the optical fiber routing assembly includes slide rails that interface with inner sidewalls of the outer frame. The slide rails facilitate installing and removing the optical fiber routing assembly from the CPO switch. In an implementation, the first set of adapters is arranged in a square-like configuration around the ASIC on the ASIC carrier. In an implementation, the housing of the optical fiber routing assembly further includes one or more or vents. In an implementation, locations of the one or more or vents of the optical fiber routing assembly matches locations of vents provided on the outer frame. In an implementation, multiple terminated jumper optical fibers of CPO modules are used to connect the CPO modules to the first set of adapters such that each of the multiple terminated jumper optical fibers is of the same or different length. In an implementation, the second set of adapters are provided as a unit such that a height of the unit is greater than a height of the housing where a majority of the plurality of optical fibers reside. In an implementation, the outer frame includes a power supply.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims. Additional aspects of the disclosure will be apparent to those of ordinary skill in the art in view of the detailed description of various embodiments, which is made with reference to the drawings, a brief description of which is provided below.

BRIEF DESCRIPTION OF THE DRAWINGS

The disclosure, and its advantages and drawings, will be better understood from the following description of embodiments together with reference to the accompanying drawings, in which.

Figure 1A:
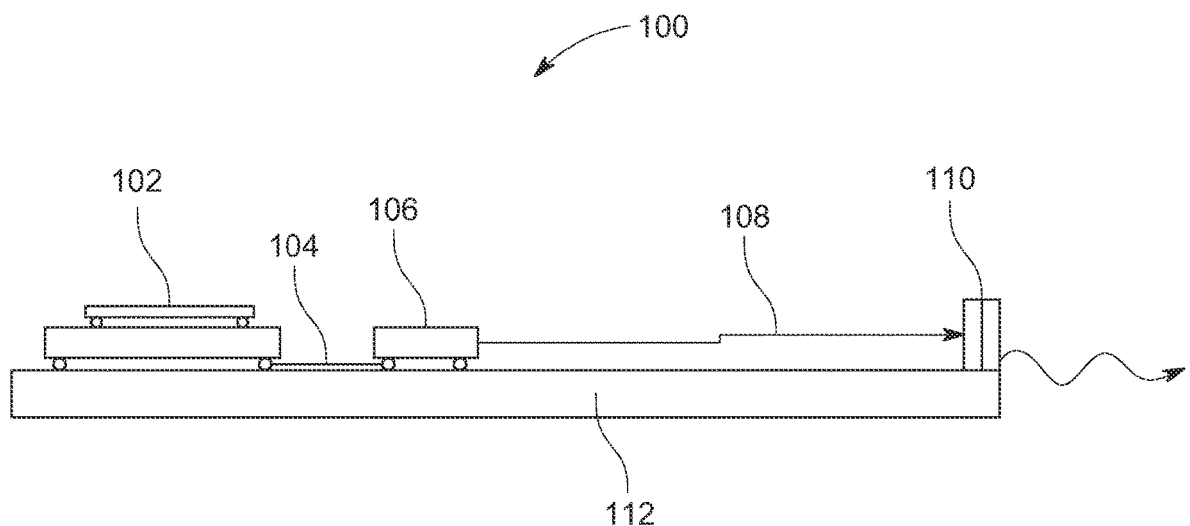
FIG. 1A illustrates a Consortium for On-Board Optics (COBO) architecture with an optical engine connected to a switch through an ASIC carrier (e.g., a printed circuit board (PCB))

The present disclosure is susceptible to various modifications and alternative forms. Some representative embodiments have been shown by way of example in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

DETAILED DESCRIPTION

Various embodiments are described with reference to the attached figures, where like reference numerals are used throughout the figures to designate similar or equivalent elements. The figures are not necessarily drawn to scale and are provided merely to illustrate aspects and features of the present disclosure. Numerous specific details, relationships, and methods are set forth to provide a full understanding of certain aspects and features of the present disclosure, although one having ordinary skill in the relevant art will recognize that these aspects and features can be practiced without one or more of the specific details, with other relationships, or with other methods. In some instances, well-known structures or operations are not shown in detail for illustrative purposes. The various embodiments disclosed herein are not necessarily limited by the illustrated ordering of acts or events, as some acts may occur in different orders and/or concurrently with other acts or events. Furthermore, not all illustrated acts or events are necessarily required to implement certain aspects and features of the present disclosure.

For purposes of the present detailed description, unless specifically disclaimed, and where appropriate, the singular includes the plural and vice versa. The word "including" means "including without limitation." Moreover, words of approximation, such as "about," "almost," "substantially," "approximately," and the like, can be used herein to mean "at," "near," "nearly at," "within 3-5% of," "within acceptable manufacturing tolerances of," or any logical combination thereof. Similarly, terms "vertical" or "horizontal" are intended to additionally include "within 3-5% of" a vertical or horizontal orientation, respectively. Additionally, words of direction, such as "top," "bottom," "left," "right," "above," and "below" are intended to relate to the equivalent direction as depicted in a reference illustration; as understood contextually from the object(s) or element(s) being referenced, such as from a commonly used position for the object(s) or element(s); or as otherwise described herein.

Optical fibers are made of glass material with a protective cladding. The specific refractive index difference between an optical fiber's core and cladding provide total reflection of optical signals and prevent signal loss in the cladding. If an optical fiber touches a heat source for an extended period of time, fiber length extension and refractive index variation can occur under high temperature. These phenomena can result in error coding. Heat can also cause damage to a protective coating layer around the optical fiber. Damage to the protective coating layer can result in fiber glass material being exposed to air. This can be an issue because alkaline material in air can corrode fiber glass material, increasing probability that the optical fiber fails. Failure of optical fibers is a concern in switch architectures where optical fibers are routed around electrical circuit components. Although, switch architectures are used here as an example, embodiments of the present disclosure may apply to any other electro-optical device.

Figure 1B:
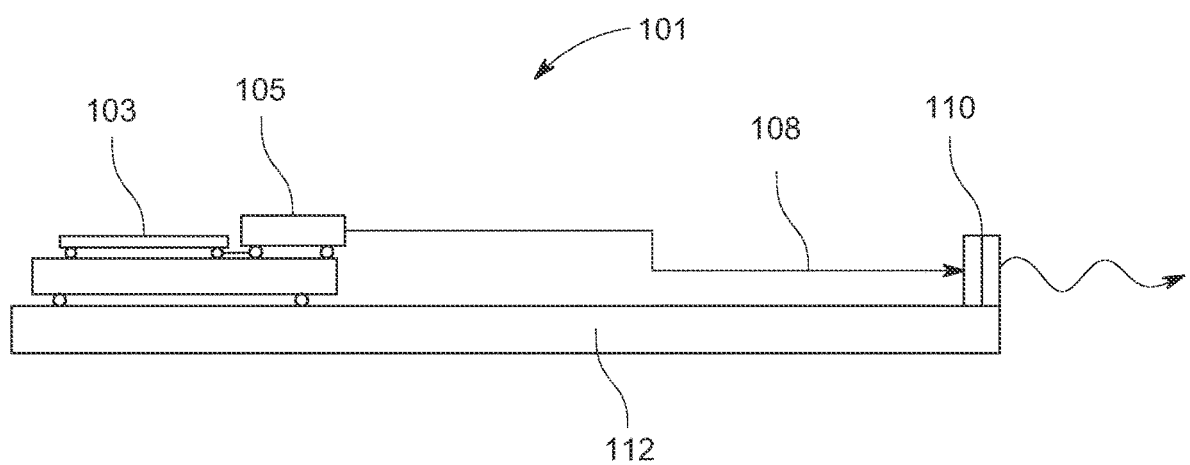
FIG. 1B illustrates a co-package optical (CPO) switch architecture with an embedded optical module.

FIGS. 1A and 1B illustrate two switch architectures for integrating optical modules on an ASIC carrier 112, for example, a printed circuit board (PCB), a substrate, etc. FIG. 1A illustrates a Consortium for On-Board Optics (COBO) switch architecture 100 with a retime/optical engine 106 connected to a switch circuit 102 through the ASIC carrier 112. A trace 104 is provided to connect the retime/optical engine 106 on the switch circuit 102. The switch circuit 102 can be an ASIC. The retime/optical engine 106 connects to a connector 110 using an on-board fiber 108. The trace 104 can be a copper connection. The retime/optical engine 106 coordinates signals between the switch circuit 102 and the on-board fiber 108. The connector 110 allows unidirectional or bidirectional signal transmission.

FIG. 1B illustrates a co-package optical (CPO) switch architecture 101 with an embedded optical module (i.e., a switch circuit 103 and an optical engine 105 are embedded on a same package). The optical engine 105 in the CPO switch architecture 101 may not require retiming, and the length between the optical engine 105 and the switch circuit 103 is shortened. As a result, loss associated with the trace 104 (FIG. 1A) is reduced, and the CPO switch architecture 101 can provide higher rate signal transmission compared to the COBO switch architecture 100. The CPO switch architecture 101 can allow increased density due to embedding the optical engine 105 and the switch circuit 103 on the same package.

Figure 2:
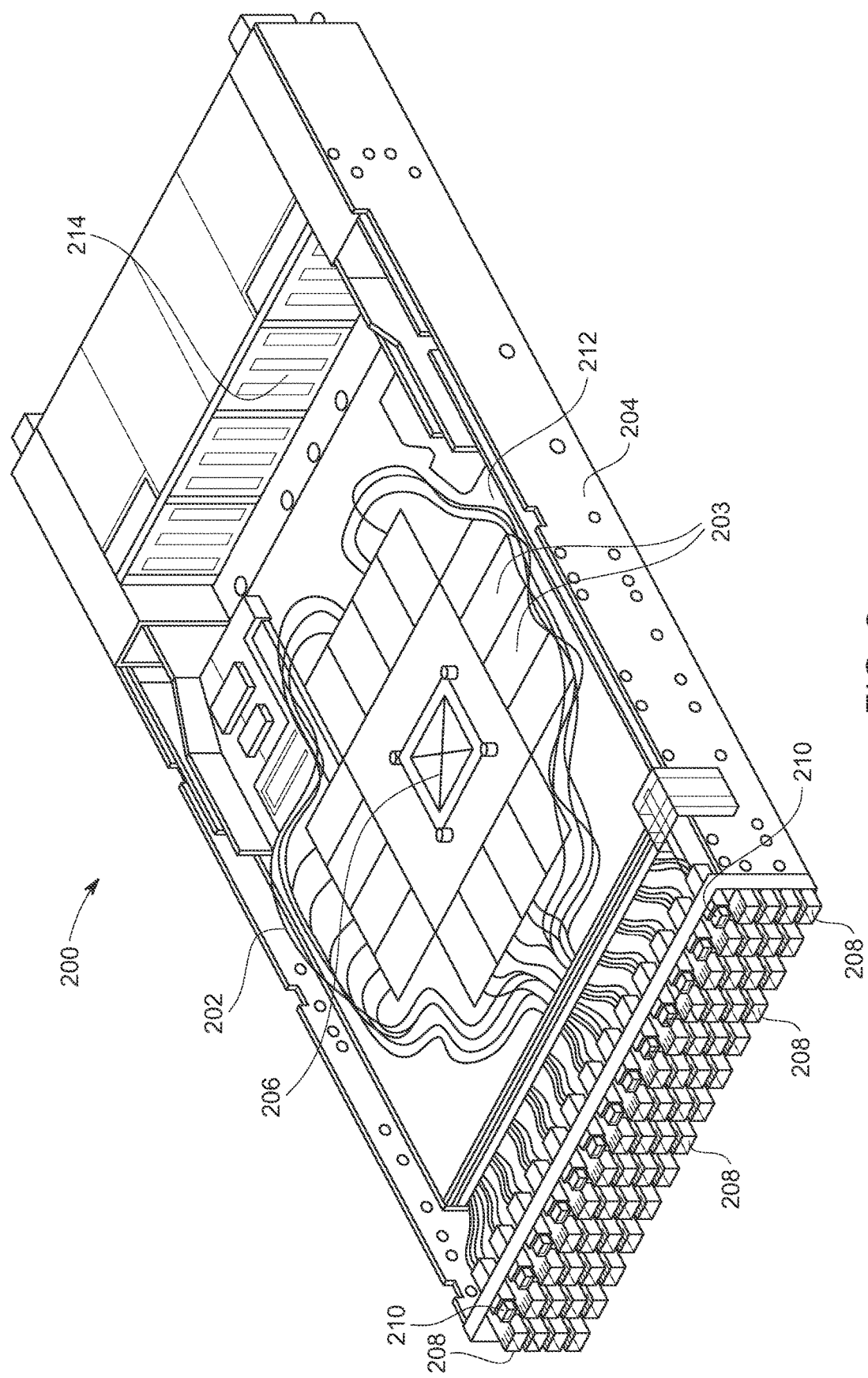
FIG. 2 illustrates a switch assembly in the prior art.

FIG. 2 illustrates a CPO switch assembly in the prior art. The switch assembly 200 includes a chassis 204 and an ASIC carrier 212 secured to the chassis 204. The ASIC carrier 212 includes an ASIC 206 for performing switching functions. The ASIC carrier 212 includes circuit components, for example, resistors, capacitors, mounted chips, inductors, heatsinks, etc. The switch assembly 200 further includes optical fiber 202 for connecting CPO modules 203 to one or more connectors (e.g., adapter 208, port 210, etc.). The adapter 208 and port 210 are examples of the connector 110 (FIG. 1B). The switch assembly 200 further includes other electronic components 214 which can include power supply, fans, etc.

The switch assembly 200 can have hundreds of optical fibers 202 arranged in a disorderly manner, causing the optical fibers 202 to cross each other. For example, given a 25.6 T CPO switch with a 64-set DR4 CPO module, each 400G DR4 needs 8 lines of optical fiber, and thus, a total of 512 lines of fiber within the 25.6 T CPO switch. The volume and distribution of the optical fibers affect the entire performance of the CPO switch. Even when using high-quality optical fibers and electronic and optical components in the CPO switch, poor fiber routing can result in various issues, including heat resistance and associated signal loss. As such, improving fiber routing and space distribution of optical fibers can improve signal integrity of CPO switches.

Figure 3:
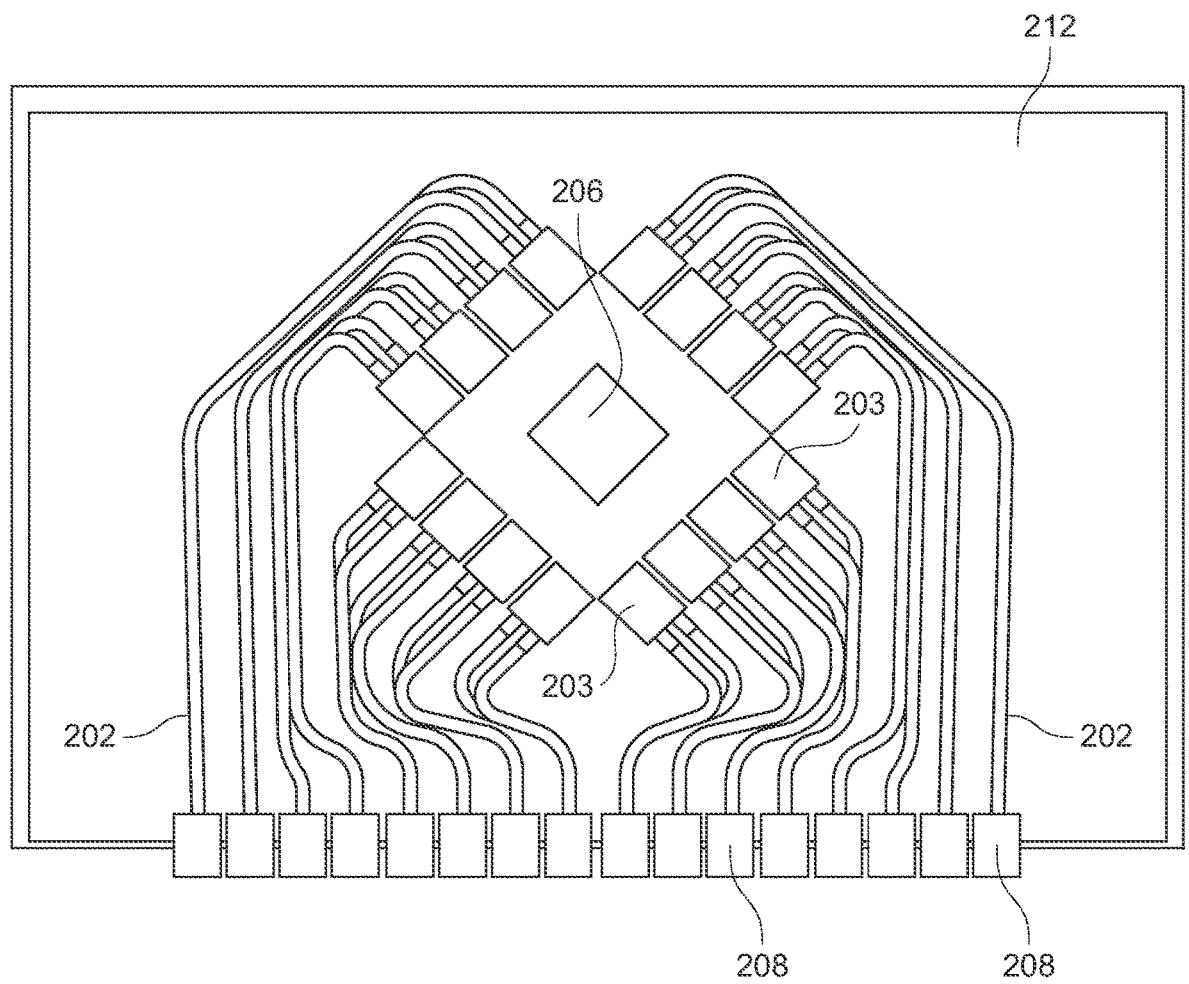
FIG. 3 illustrates fiber optic connections of CPO modules of the prior art.

FIG. 3 illustrates fiber optic connections of CPO modules 203 of the prior art. In a CPO switch, the CPO modules 203 are distributed around the ASIC chip 206. The arrangement of the CPO modules 203 affects not only the length of the optical fibers 202, but also convenience in (un)installing any elements on the ASIC carrier 212. The length of the optical fibers can be pigtailed, depending on location of the CPO modules 203. A CPO switch engineered for high speed signal transmission can have hundreds of optical fibers in a small form factor. Optical fibers can be easily broken or bent during manipulation. Thus, in the process of fixing a single broken fiber, there is a risk of breaking additional optical fibers in the CPO switch. Ease of maintain optical fiber should be taken into account for switch designs. Moreover, the bends in the optical fibers (i.e., the pigtails) can result in damage of the optical fibers. Thus, improper fiber management in a CPO switch can result in inadvertent costs. Furthermore, due to the arrangement of optical fibers in the CPO switch, smoothness of heat flux throughout the CPO switch is affected by volume and routing of the optical fibers. If optical fibers are arranged such that the optical fibers randomly cross circuit boards or heat sinks, the wind resistance of the optical fibers will be increased, further degrading heat dissipation in the CPO switch.

Some embodiments of the present disclosure provide an optical fiber routing assembly for optical fiber management. The optical fiber routing assembly can be conveniently installed and removed from a CPO switch. The optical fiber routing assembly provides reduced wind resistance, compared to conventional switches, when hundreds of optical fibers are installed. The optical fiber routing assembly improves heat flux throughout the CPO switch. The optical fiber routing assembly prevents breaking optical fibers during maintenance, since the optical fibers are not routed around other electronic elements on a PCB. Due to lack of routing around the other electronic elements, optical fibers in the optical fiber routing assembly do not directly come in contact with heat sources of the CPO switch. The optical fiber routing assembly standardizes the distance between optical fiber routing from a CPO module to adapters.

Figure 4:
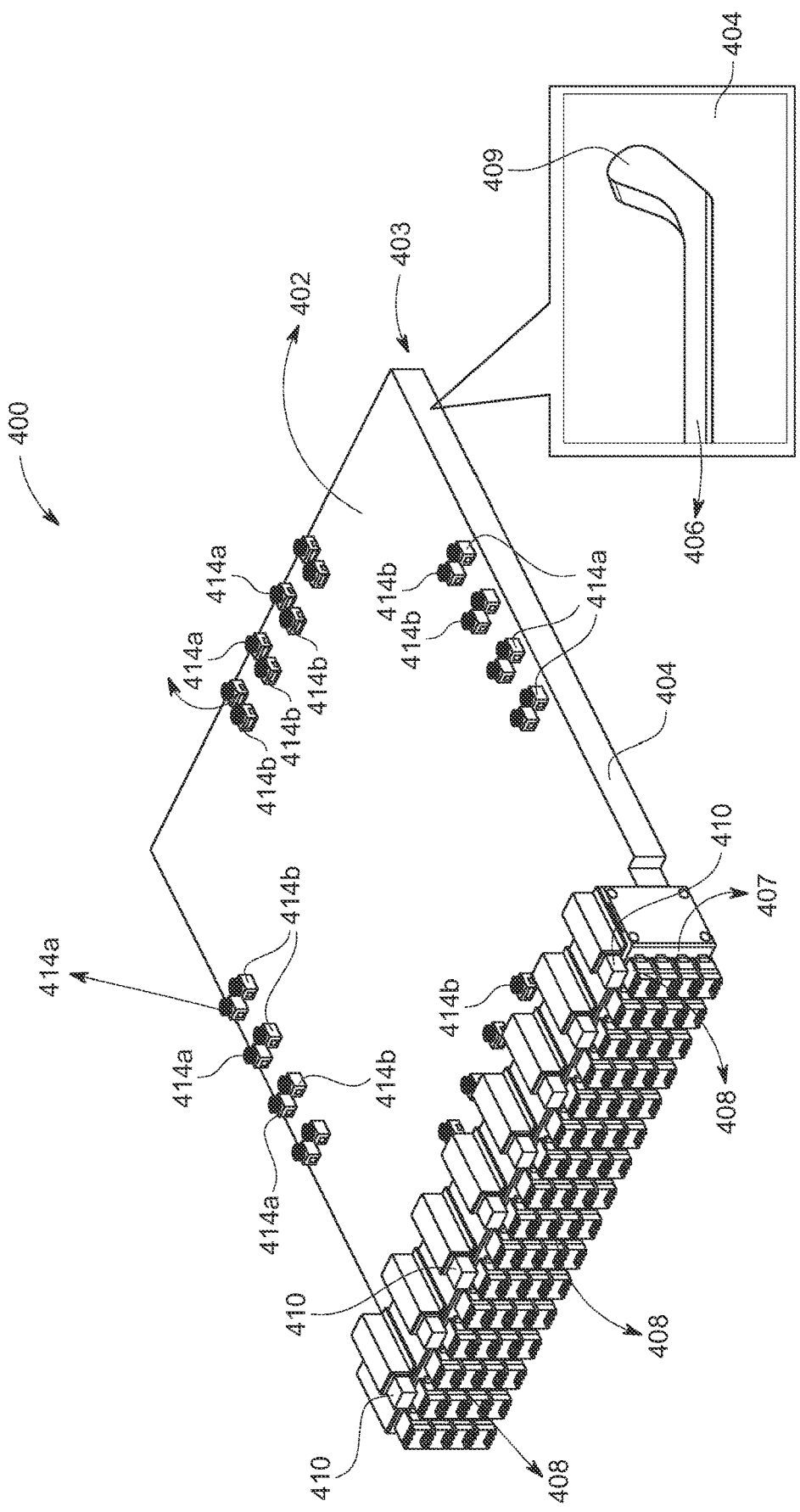
FIG. 4 illustrates a front perspective view of an optical fiber routing assembly, according to some implementations of the present disclosure.
Figure 5:
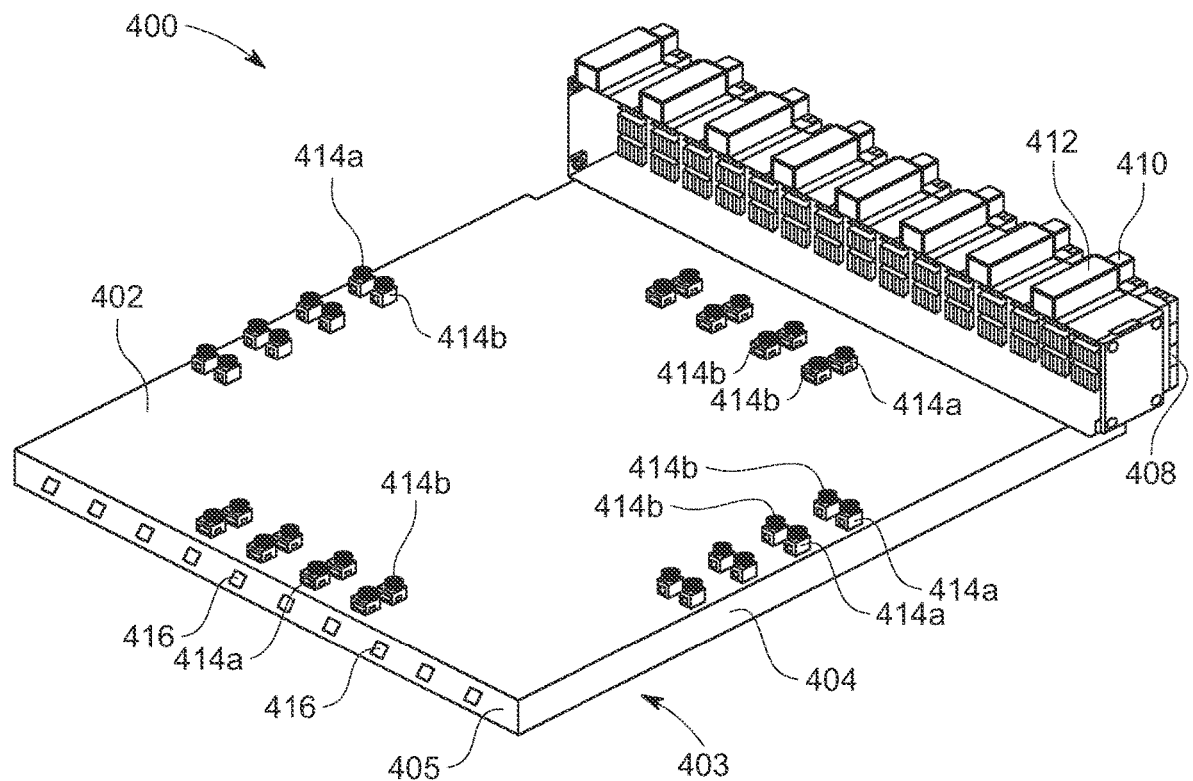
FIG. 5 illustrates a back perspective view of the optical fiber routing assembly of FIG. 4, according to some implementations of the present disclosure.

FIG. 4 illustrates a front perspective view of an optical fiber routing assembly 400, according to some implementations of the present disclosure. FIG. 5 illustrates a back perspective view of the optical fiber routing assembly 400, according to some implementations of the present disclosure. Reference numbers in the discussion below will mostly come from FIG. 4, and if not shown in FIG. 4, will be indicated as being shown in FIG. 5. The optical fiber routing assembly 400 is an isolated assembly set that can be installed in a switch. The optical fiber routing assembly 400 includes an assembly housing 403 with an upper panel 402, two side panels 404, a bottom panel (not shown), and a rear panel 405 (FIG. 5). The optical fiber routing assembly 400 further includes an adapter unit 407.

The upper panel 402 includes multiple sets of outer adapters 414a and inner adapters 414b. In an example, the sets of adapters 414a, 414b are arranged in a square-like configuration, but other arrangements are envisioned. The set of adapters 414a, 414b includes optical fiber adapters that facilitate connecting optical fibers, provided within the assembly housing 403 of the optical fiber routing assembly 400, with electronic components (not shown) that are provided outside of the assembly housing 403. Connectors that terminate the optical fibers connect to the set of adapters 414a, 414b.

The adapter unit 407 provided on the optical fiber routing assembly 400 includes data transmission adapters 408 and laser ports 410. The data transmission adapters 408 and laser ports 410 are optical input/output interfaces facilitating data communication between the optical fiber routing assembly 400 and other systems. The data transmission adapters 408 and the laser ports 410 are examples of the connector 110 (FIG. 1B). The adapter unit 407 is connected to the set of adapters 414a, 414b via routed optical fiber within the optical fiber routing assembly 400. The data transmission adapters 408 and the laser ports 410 enable communication between electronic systems. Examples of electronic systems include other CPO switches (e.g., the CPO switch 101, 200 or 1203), another COBO switch 100, transceiver modules in other servers or switches, or any other optoelectronic converter electronic systems.

Along the side panel 404, a slide rail 406 is provided. The slide rail 406 facilitates installing the optical fiber routing assembly 400 into a switch (not shown) by sliding the optical fiber routing assembly 400 along a sidewall of the switch. The side panel 404 also includes a position fixing hole 409 for matching the side panel 404 with the sidewall of the switch, so that the optical fiber routing assembly 400 can slide into the switch along the slide rail 406. The optical fiber routing assembly 400 is an elegant design without complicated fiber routing on the exterior. Suitable I/O adapters (e.g., the data transmission adapters 408, the laser ports 410, etc.) are provided for connecting to other systems, and fiber management is provided within the optical fiber routing assembly 400. The fiber routing assembly 400 enables high density fiber management, avoiding electronic components interfering with positioning of optical fibers, thus providing ease in maintenance.

The rear panel 405 (FIG. 5) includes rear vents 416 (FIG. 5) to facilitate airflow within the optical fiber routing assembly 400. The rear vents 416 (FIG. 5) promote heat dissipation from the optical fiber routing assembly 400. Since the optical fiber routing assembly 400 is configured to slide into a switch (not shown), positions of the rear vents 416 (FIG. 5) can be chosen to substantially match positions of vents on the switch so as to optimize airflow through the switch.

Figure 6:
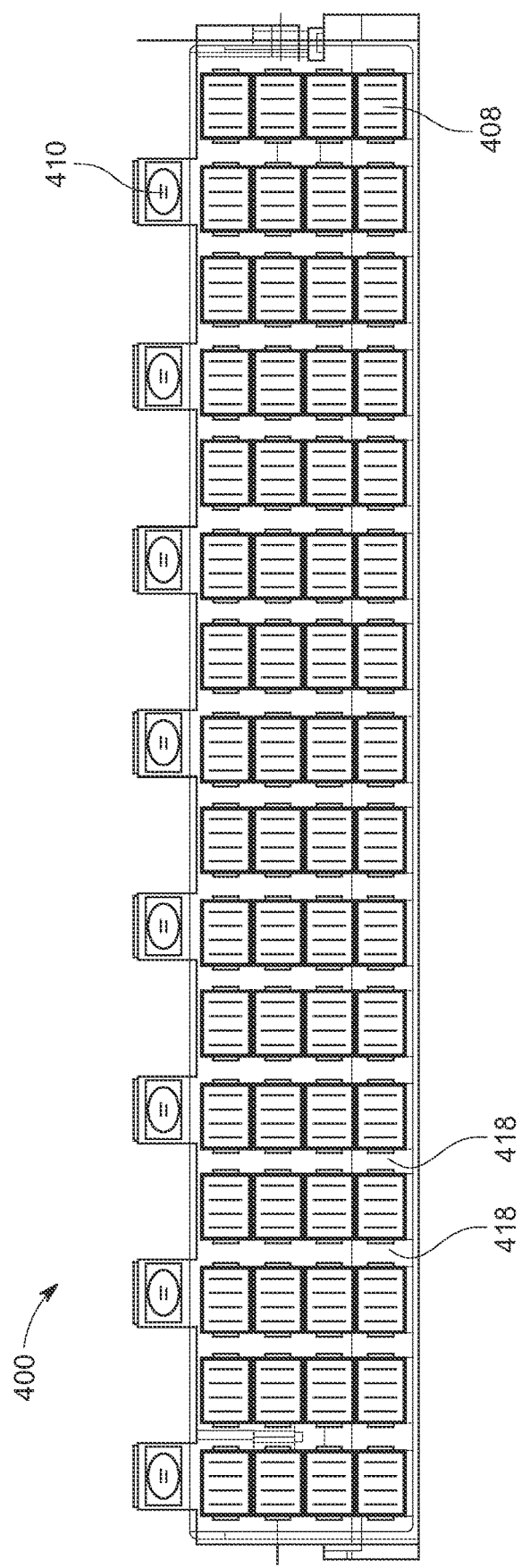
FIG. 6 illustrates a front view of the optical fiber routing assembly of FIG. 4, according to some implementations of the present disclosure.
Figure 7:
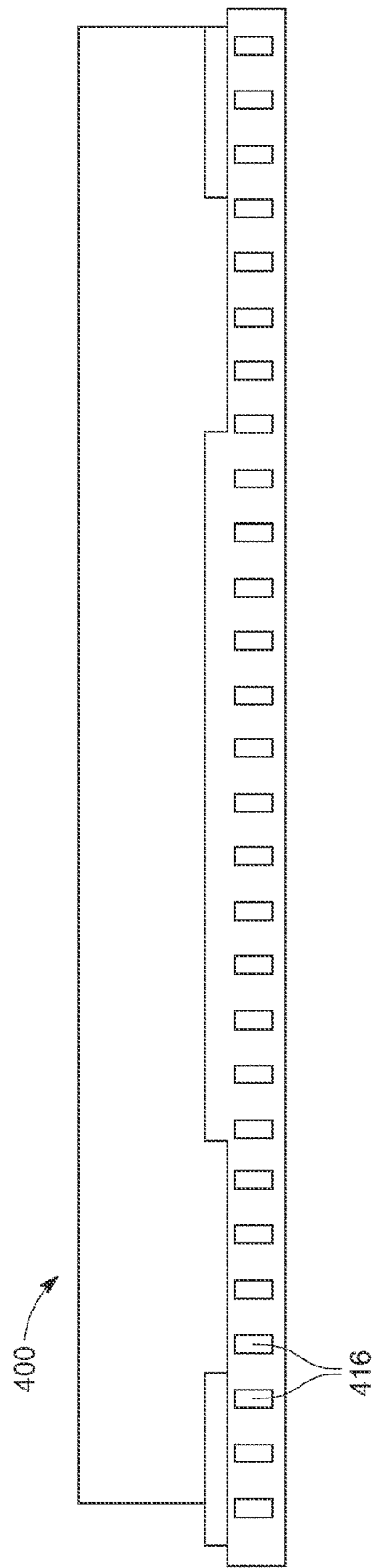
FIG. 7 illustrates a back view of the optical fiber routing assembly of FIG. 4, according to some implementations of the present disclosure.

FIG. 6 illustrates a front view of the optical fiber routing assembly 400, according to some implementations of the present disclosure. FIG. 7 illustrates a back view of the optical fiber routing assembly 400, according to some implementations of the present disclosure. In FIG. 6, front vents 418 are provided between the data transmission adapters 408 in the adapter unit 407. In FIG. 7, the rear vents 416 are visible. The rear vents 416 can be provided to substantially match line of sight of the front vents 418 to optimize for airflow through the optical fiber routing assembly 400.

Figure 8:
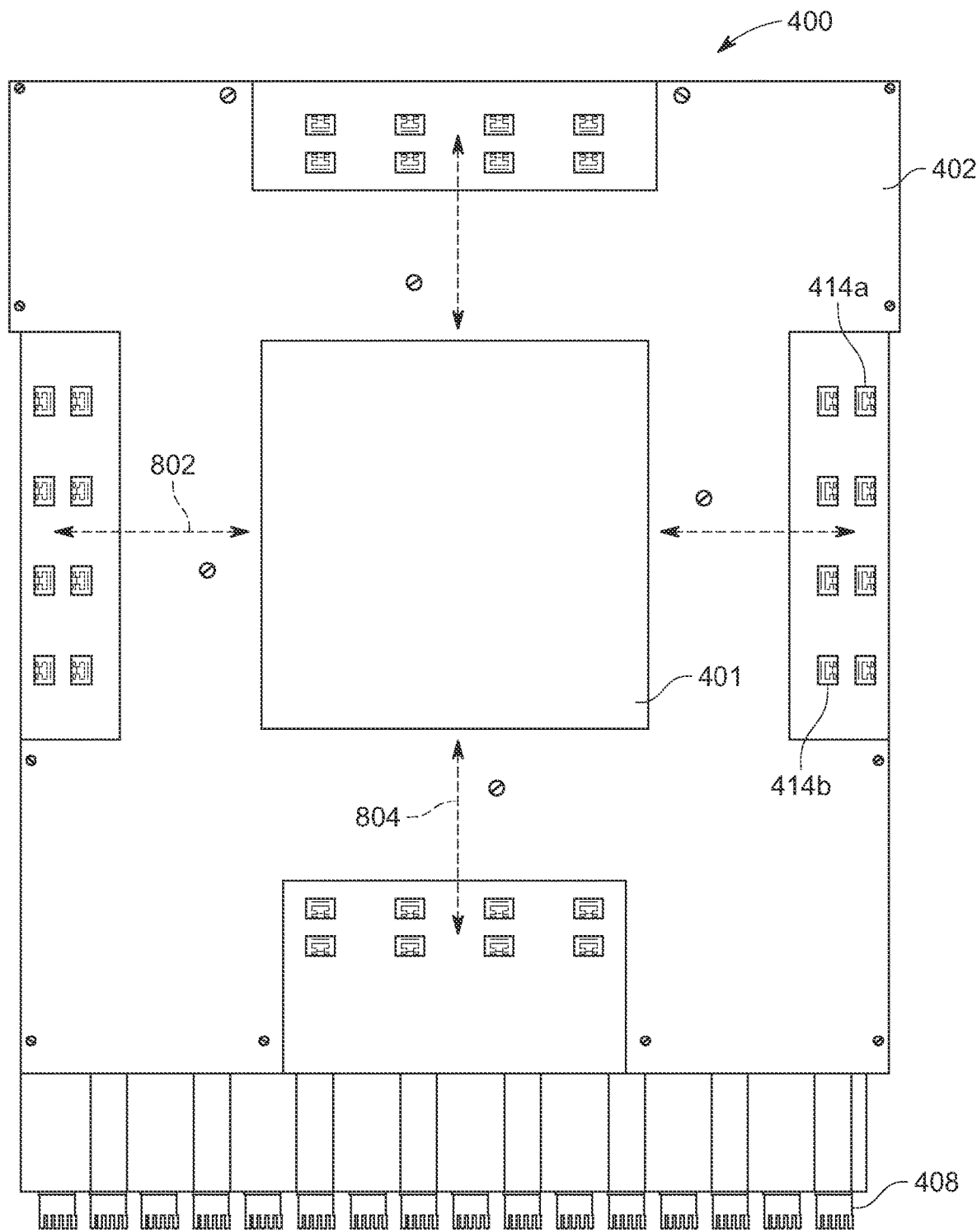
FIG. 8 illustrates a top view of the optical fiber routing assembly of FIG. 4, according to some implementations of the present disclosure.

FIG. 8 illustrates a top view of the optical fiber routing assembly 400, according to some implementations of the present disclosure. The sets of adapters 414a, 414b are arranged in a square-like or rectangular configuration around a position 401 of an ASIC chip (not shown). The square-like or rectangular configuration is a standardized arrangement that allows designing for standard lateral separations 802, 804 of the sets of adapters 414a, 414b from the ASIC chip. Jumper optical fibers to CPO modules, which are installed on the ASIC carrier holding the ASIC chip, further connect the CPO module and the sets of adapters 414a, 414b. The length of the jumper optical fibers can be made of the same or different length. So when the lateral separation 802 is equal to the lateral separation 804, then the length of the jumper optical fibers can be made of the same length. Having a standardized fiber length from CPO modules to adapters can minimize complications during maintenance or during manufacture of the optical fiber routing assembly 400, since the procedure of measuring, cutting, and terminating custom-length optical fibers is avoided.

Figure 9:
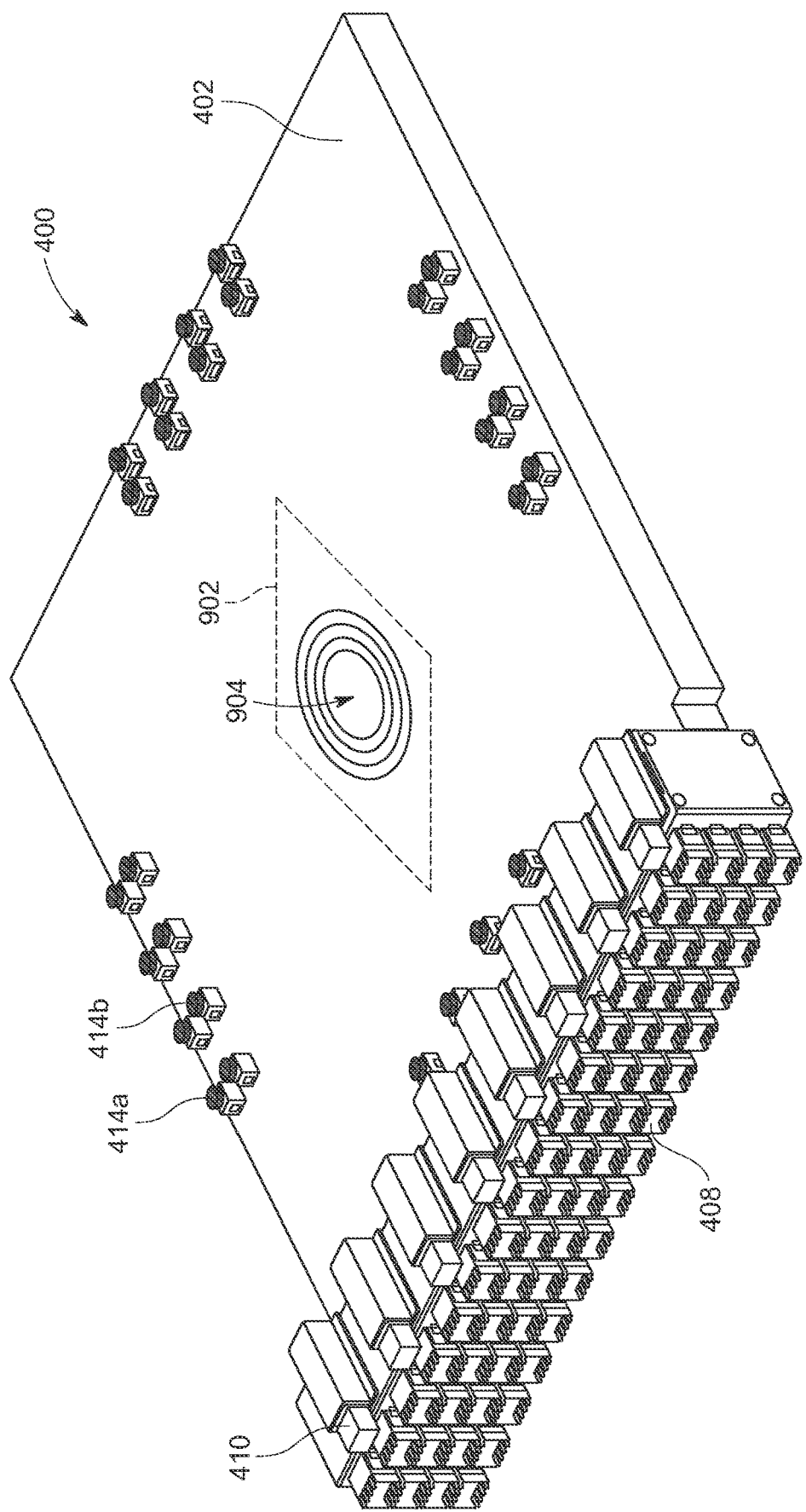
FIG. 9 illustrates fiber routing within the optical fiber routing assembly of FIG. 4, according to some implementations of the present disclosure.

FIG. 9 illustrates that optical fiber routing occurs within the optical fiber routing assembly 400. A cutout 902 is made in the upper panel 402 to expose fiber routing 904. The sets of adapters 414a, 414b provide the CPO module access to the routed optical fiber contained within the optical fiber routing assembly 400. The routed optical fiber within the optical fiber routing assembly 400 is directly connected to the data transmission adapters 408 and the laser ports 410 without being exposed to any electronic components associated with the ASIC chip.

Figure 10:
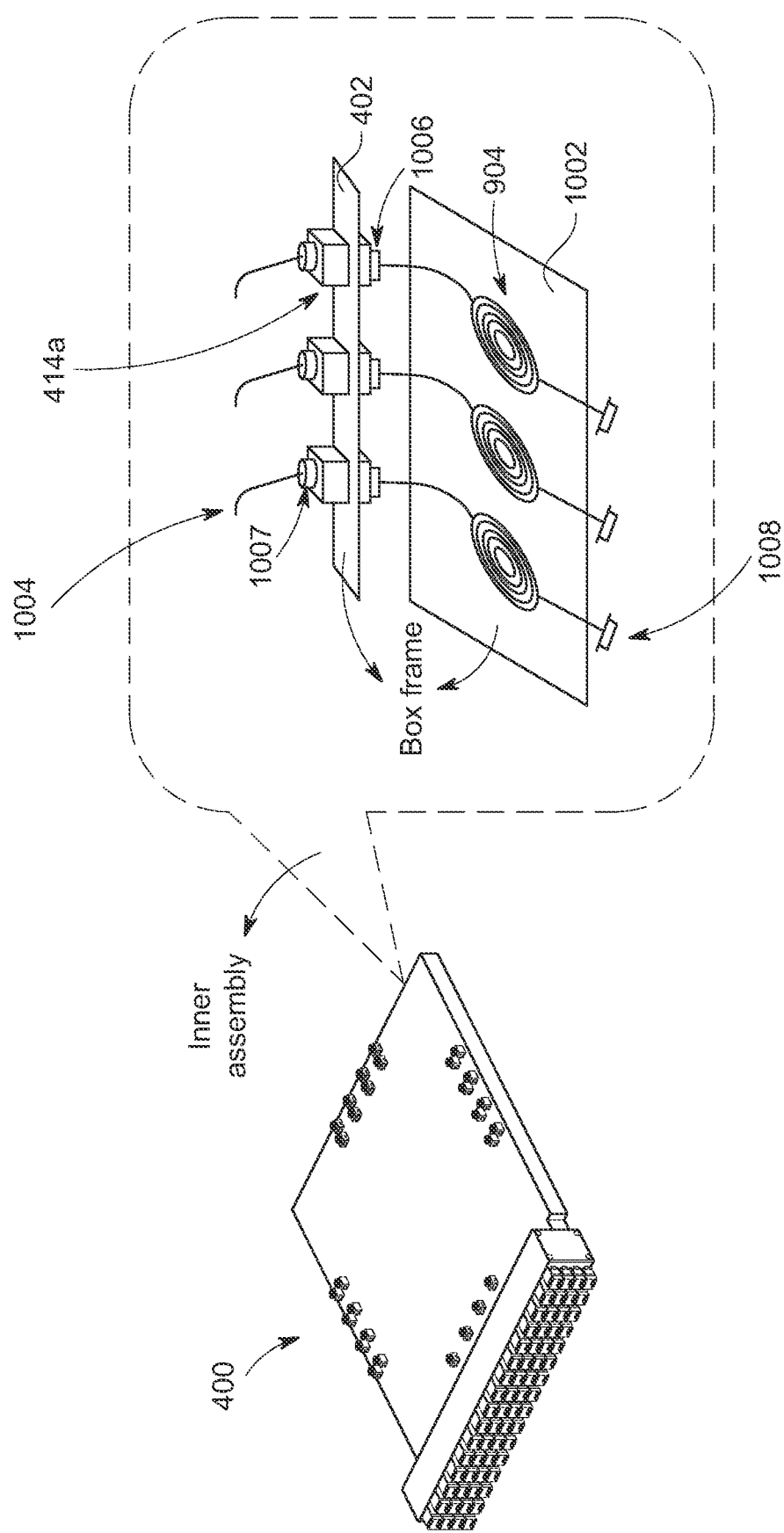
FIG. 10 illustrates fiber routing between connectors in the optical fiber routing assembly of FIG. 4, according to some implementations of the present disclosure.

FIG. 10 illustrates optical fiber routing between the outer adapters 414a (and/or inner adapters 414b) and the data transmission adapters 408 (FIG. 9) (and/or laser ports 410), according to some implementations of the present disclosure. The routed optical fiber 904 sits between the upper panel 402 and a bottom panel 1002 of the optical fiber routing assembly 400. The routed optical fiber 904 are terminated on each end by connectors 1006 and 1008. The data transmission adapters 408 (FIG. 9) are horizontally connected to the routed optical fiber 904 via the connectors 1008, and the adapters 414a are vertically connected to the routed optical fiber 904 via the connectors 1006. Similarly, although not shown, the laser ports 410 are horizontally connected to the routed optical fiber 904, and the adapters 414b are vertically connected to the routed optical fiber 904 via the connectors 1006. To accommodate the horizontal and vertical connections, the routed optical fiber 904 exhibits a bending. The bending can have a maximum curvature based on failure probability of the type of optical fiber chosen. The bending of the routed optical fiber 904 can also determine a height of the side panel 404 (FIG. 4) (i.e., a thickness of the optical fiber routing assembly 400 or the separation between the upper panel 402 and the bottom panel 1002). FIG. 10 also depicts jumper optical fiber 1004 of pigtailed CPO module that can connect to the CPO module (not shown) installed on the ASIC carrier (not shown). The jumper optical fiber 1004 is terminated by connector 1007 that connects the jumper optical fiber 1004 to the adapters 414a.

Figure 11:
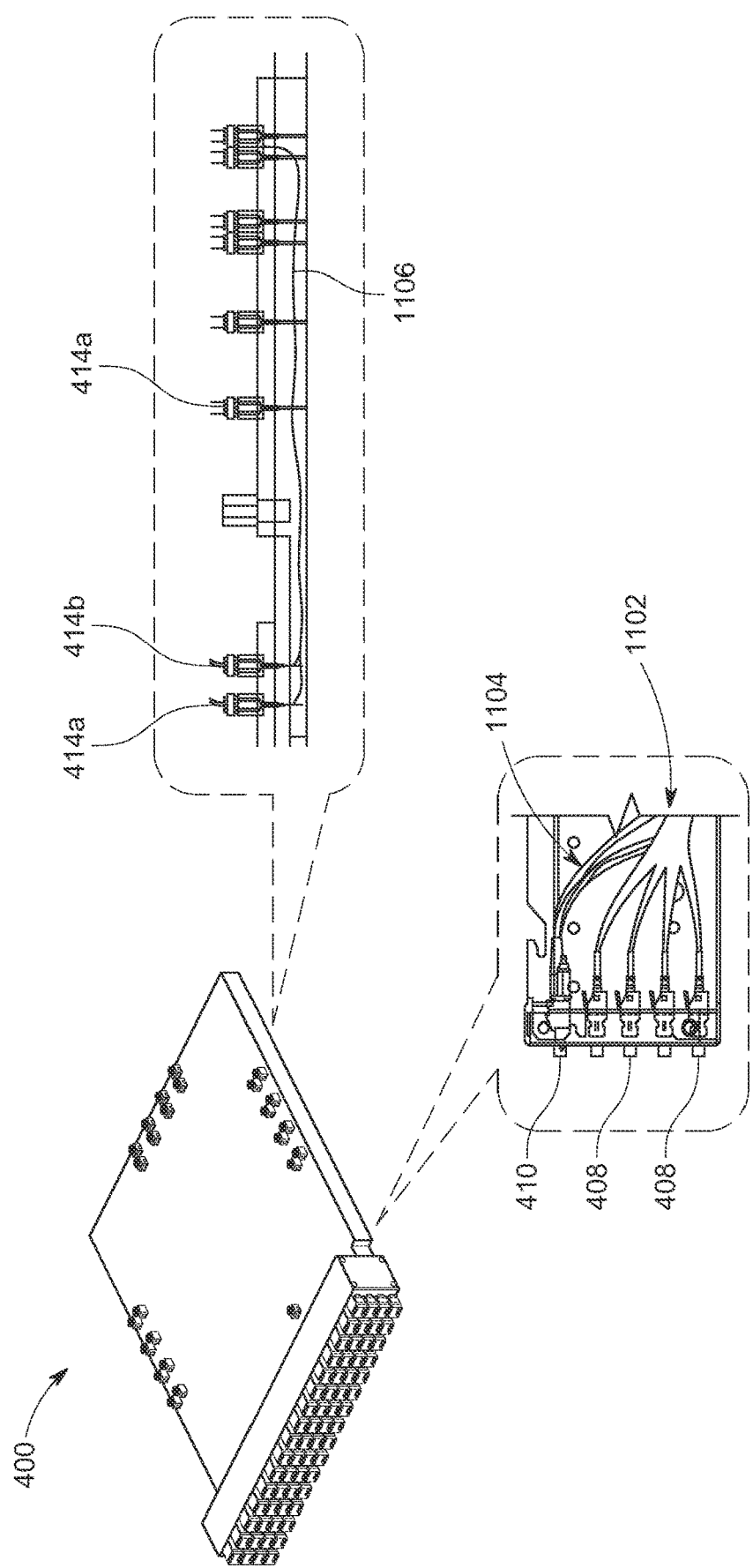
FIG. 11 illustrates fiber bending in the optical fiber routing assembly of FIG. 4, according to some implementations of the present disclosure.

FIG. 11 illustrates optical fiber bending in the optical fiber routing assembly 400, according to some implementations of the present disclosure. Vertical connection of the adapters 414a, 414b results in routed optical fiber 1106 that is substantially orthogonal to the adapters 414a, 414b. Horizontal connection of the data transmission adapters 408 and the laser ports 410 allow the routed optical fibers 1102 and 1104 not to exhibit as much bending compared to the routed optical fiber 1106. As a result, the lifetime of routed optical fibers in the optical fiber routing assembly 400 can be mainly influenced by the bending of the routed optical fiber 1106.

Thus, reduced bending (i.e., reducing curvature) of the routed optical fiber 1106 can increase lifetime and decrease failure probability. But reduced bending of the routed optical fiber 1106 can increase thickness of the optical fiber routing assembly 400. In some implementations, the thickness of the optical fiber routing assembly 400 is about 15 mm.

Figure 12:
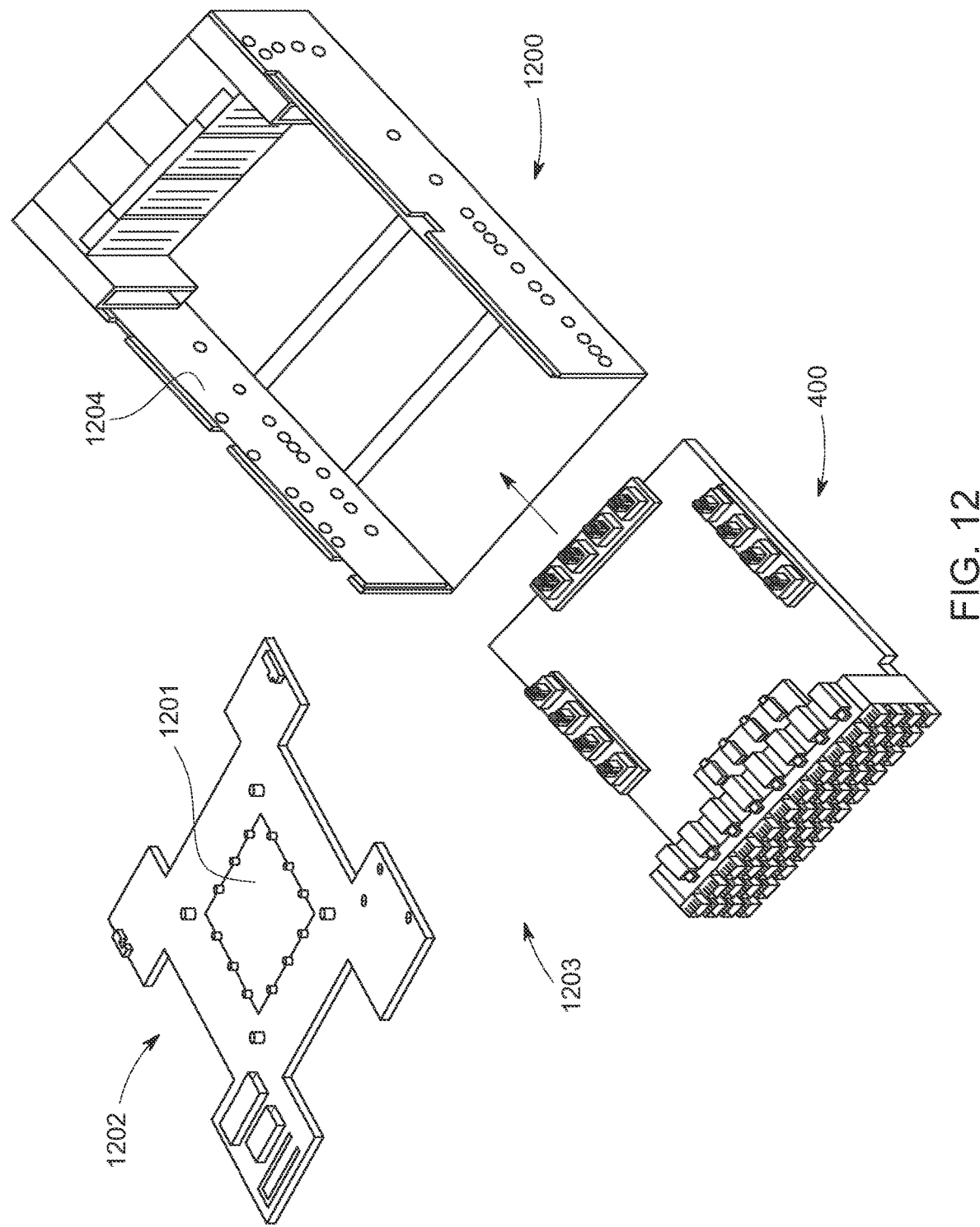
FIG. 12 illustrates a CPO switch, according to some implementations of the present disclosure.

FIG. 12 illustrates components of a CPO switch 1203, according to some implementations of the present disclosure. The CPO switch 1203 includes an ASIC carrier 1202 with an ASIC chip 1201, the optical fiber routing assembly 400, and an outer frame 1200. The ASIC carrier 1202 also includes CPO modules (e.g., as depicted in FIG. 1B). The ASIC carrier 1202 is configured to sit atop the optical fiber routing assembly 400. Jumper optical fiber 1004 of the CPO module (FIG. 10) can connect the CPO module to the routed optical fiber within the optical fiber routing assembly 400. With this arrangement, fiber management and fiber routing around electronic components is minimized when compared with FIGS. 2 and 3. Once the ASIC carrier 1202 is connected to the optical fiber routing assembly 400, the optical fiber routing assembly 400 can be installed in the outer frame 1200 of the CPO switch.

The outer frame 1200 includes an inner sidewall 1204 that interfaces with the side panel 404 (FIG. 4) of the optical fiber routing assembly 400. In some implementations, the optical fiber routing assembly 400 slides along the inner sidewall 1204, as discussed above in connection with FIG. 4. The outer frame 1200 of the CPO switch can include other components like power supply, fans, etc. Embodiments of the present disclosure separate optical fiber management from electronic components in a CPO switch, facilitating ease in maintaining the CPO switch. The ASIC carrier 1202 can be serviced independent of the routed optical fiber in the optical fiber routing assembly 400. Access to electronic components on the ASIC carrier 1202 does not involve shifting routed optical fiber, which reduces opportunities for accidentally breaking optical fiber during maintenance.

Although the disclosed embodiments have been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

While various embodiments of the present disclosure have been described above, it should be understood that they have been presented by way of example only, and not limitation. Numerous changes to the disclosed embodiments can be made in accordance with the disclosure herein, without departing from the spirit or scope of the disclosure. Thus, the breadth and scope of the present disclosure should not be limited by any of the above described embodiments. Rather, the scope of the disclosure should be defined in accordance with the following claims and their equivalents The terminology used herein is for the purpose of describing particular embodiments only, and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

What is claimed is:

1. An optical fiber routing assembly for interfacing with co-package optical (CPO) modules, the optical fiber routing assembly comprising:
   a housing;
   a plurality of terminated optical fibers routed within the housing, each of the terminated optical fibers being terminated with a fiber connector on each end of the optical fiber;
   a first set of adapters arranged vertically on an upper panel of the housing, the first set of adapters configured to facilitate connecting the plurality of terminated optical fibers to the CPO modules via terminated jumper optical fibers separate and distinct from the plurality of terminated optical fibers;
   a second set of adapters arranged horizontally and configured to facilitate connecting the plurality of terminated optical fibers to one or more electronic systems, wherein a combination of the first set of adapters and the second set of adapters facilitates communication between the CPO modules and the one or more electronic systems.

2. The assembly of claim 1, wherein the CPO modules are positioned above the upper panel of the housing.

3. The assembly of claim 1, wherein the assembly is an isolated set such that the housing is configured to be installed and removed from a CPO switch.

4. The assembly of claim 1, wherein multiple terminated jumper optical fibers are used to connect the first set of adapters such that each of the multiple jumper optical fibers is of the same length.

5. The assembly of claim 1, wherein the second set of adapters includes a laser port, a data transmission adapter, or both.

6. The assembly of claim 1, wherein the housing includes side panels with slide rails.

7. The assembly of claim 6, wherein the slide rails have a fixing point.

8. The assembly of claim 1, wherein the first set of adapters include an inner set of adapters and an outer set of adapters, the inner set of adapters is located closer to the CPO modules when compared to the outer set of adapters.

9. The assembly of claim 1, wherein the first set of adapters is arranged in a square-like configuration around an application specific integrated circuit (ASIC).

10. The assembly of claim 1, wherein one of the plurality of terminated optical fibers connecting a first one of the first set of adapters and a first one of the second set of adapters exhibits greater bending proximate to the first one of the first set of adapters compared to the first one of the second set of adapters.

11. A co-packaged optical (CPO) switch comprising:
    an outer frame;
    an application specific integrated circuit (ASIC) carrier including CPO modules and an ASIC for performing switching operations; and an optical fiber routing assembly, including
- a housing;
- a plurality of terminated optical fibers routed within the housing, each of the terminated optical fibers being terminated with a fiber connector on each end of the optical fiber;
- a first set of adapters arranged vertically on an upper panel of the housing, the first set of adapters configured to facilitate connecting the plurality of terminated optical fibers to the CPO modules via terminated jumper optical fibers separate and distinct from the terminated optical fibers;
- a second set of adapters arranged horizontally and configured to facilitate connecting the plurality of terminated optical fibers to one or more electronic systems, wherein a combination of the first set of adapters and the second set of adapters facilitates communication between the CPO modules and the one or more electronic systems.

12. The CPO switch of claim 11, wherein the CPO modules are positioned above the upper panel of the housing of the optical fiber routing assembly.

13. The CPO switch of claim 11, wherein the housing of the optical fiber routing assembly includes slide rails that interface with inner sidewalls of the outer frame, the slide rails facilitating installing and removing the optical fiber routing assembly from the CPO switch.

14. The CPO switch of claim 11, wherein the first set of adapters is arranged in a square-like configuration around the ASIC on the ASIC carrier.

15. The CPO switch of claim 11, wherein the housing of the optical fiber routing assembly further includes one or more vents.

16. The CPO switch of claim 15, wherein locations of the one or more vents of the optical fiber routing assembly matches locations of vents provided on the outer frame.

17. The CPO switch of claim 11, wherein the second set of adapters of the optical fiber routing assembly includes a laser port, a data transmission adapter, or both.

18. The CPO switch of claim 11, wherein multiple terminated jumper optical fibers of CPO modules are used to connect the CPO modules to the first set of adapters such that each of the multiple terminated jumper optical fibers is of the same length.

19. The CPO switch of claim 11, wherein the second set of adapters are provided as a unit such that a height of the unit is greater than a height of the housing where a majority of the plurality of optical fibers reside.

20. The CPO switch of claim 11, wherein the outer frame includes a power supply.

* * * * *